United States Patent Office 3,392,769
Patented July 16, 1968

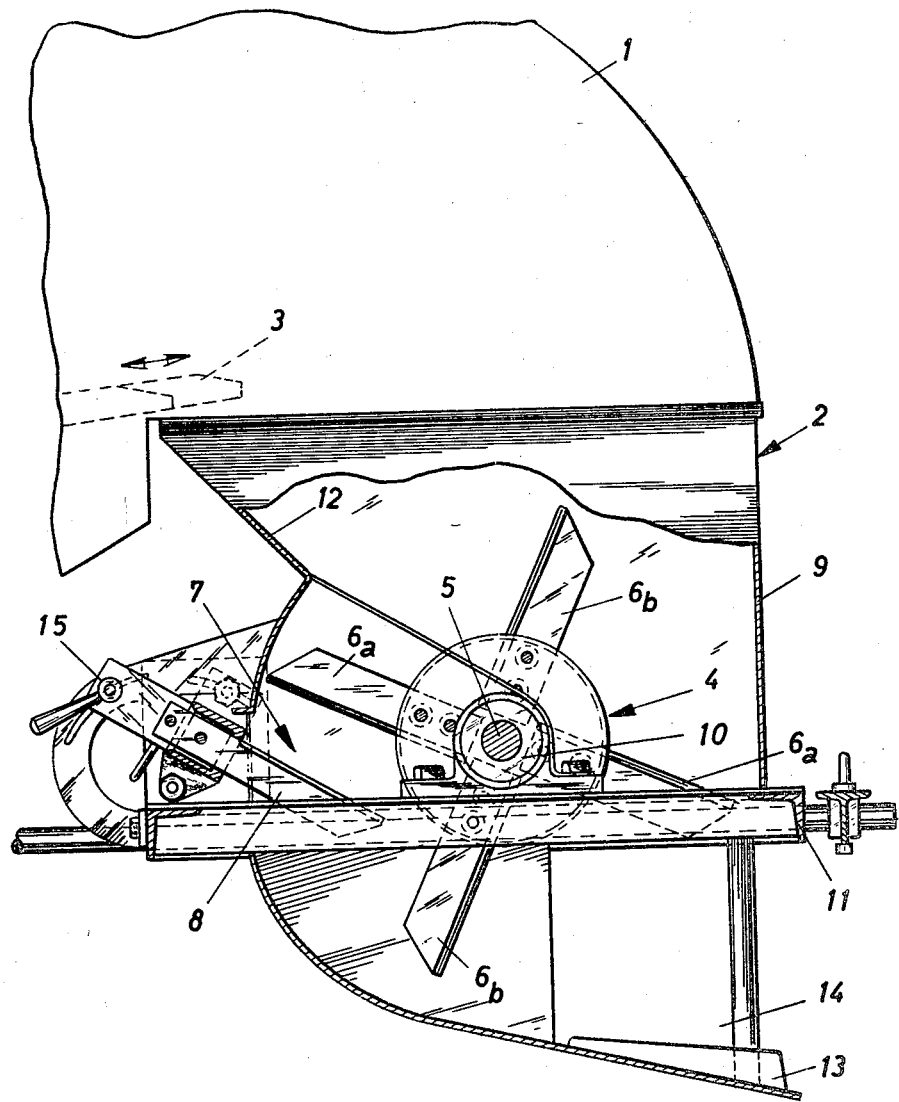

3,392,769
APPARATUS FOR THE DISINTEGRATION OF STRAW AND THE LIKE
Anton Bertil Grönberg, Ottum, Sweden
Filed Dec. 2, 1965, Ser. No. 511,107
Claims priority, application Sweden, Dec. 9, 1964, 14,849/64
3 Claims. (Cl. 146—123)

ABSTRACT OF THE DISCLOSURE

This invention relates to means for cutting straw and other similar materials after harvesting, and more particularly to a unique arrangement of flexible rotor cutting arms which act in concert with stationary grate arms to cut, tear and crush said straw or other material.

---

Figure 3:
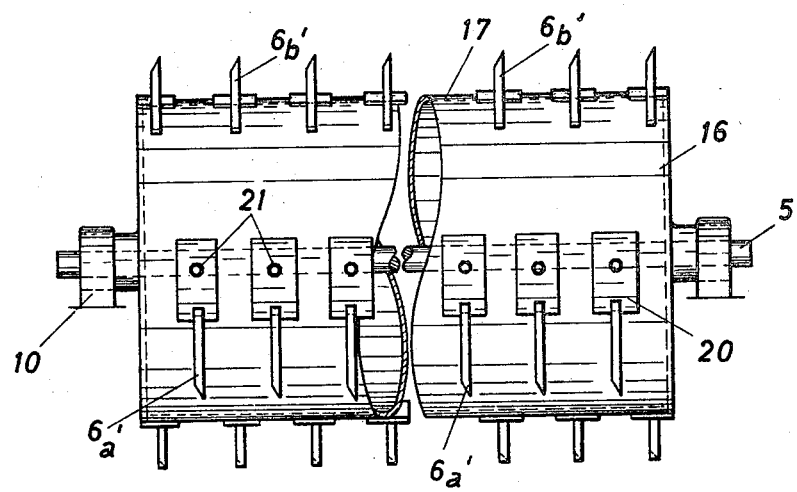

This invention has reference to apparatuses for the disintegration of straw and similar material of the kind comprising a rotor journalled in a housing, said rotor provided with a number of longitudinally extending arms arranged in rows, projecting from the rotor shaft and provided with a cutting edge, said arms adapted to pass, at the operation of the rotor, between a row of grate arms directed towards the rotor and also provided with cutting edges, the material to be cut being fed towards said grate arms, a space arranged between each rotor arm and the adjacent grate arm, said space permitting the arms by means of their elasticity to be displaced in lateral direction without being brought into contact with any adjacent arm. Thus, the invention relates to the kind of cutting apparatuses described and shown in the Swedish Patent No. 173,334, partly corresponding to the U.S. Patent No. 2,752,969.

At such cutting apparatuses it has turned out that the rotor rotating with a high speed with its rows of rather closely situated rotor arms creates an air stream which is directed towards the straw coming from the shake sieve of the combine-harvester. Thereby, the feeding of the straw down to the grate knives is counteracted. A vault of straws is easily formed below the discharge end of the shake sieve and when the straw agglomeration thus formed has grown to a sufficient weight it falls down into the cutter due to the vibrations during the driving of the combine-harvester over the field. This bulky and uneven feeding of the straw results therein that the disintegration of the straw will be uneven and the stresses on the cutter at periods will be un-normally high.

The purpose of the present invention is to overcome these drawbacks. The main feature of the invention is to be seen therein that the number of rows of rotor arms is even, preferably four, and that the pitch between the rotor arms is two times the pitch between the grate arms and therein that only every second row of rotor arms during the operation of the rotor passes through the space between a pair of neighbouring grate arms. Due to this arrangement of the rotor arms their number can be reduced to at least half the previously used number or at least with a third of the number which was hitherto considered as necessary. The fan effect of the rotor is hereby considerably reduced and the feeding of the straw and thus also the cutting effect is rendered considerably more even. The balancing of the rotor is facilitated and the costs of manufacture of the same are reduced.

Figure 2:
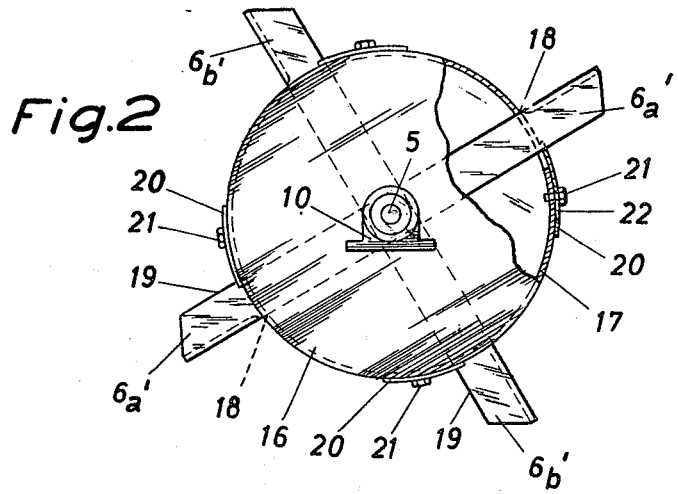
Figure 4:
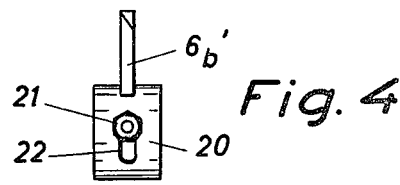
Figure 5:
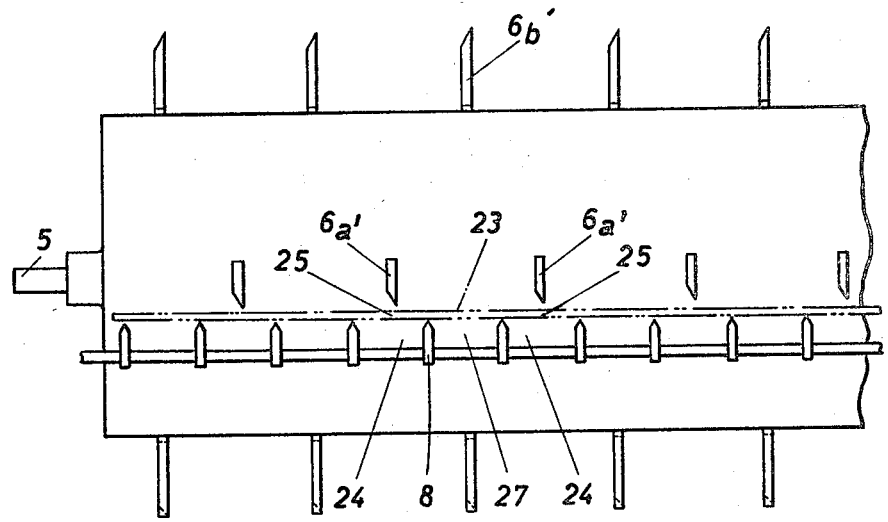
Figure 6:
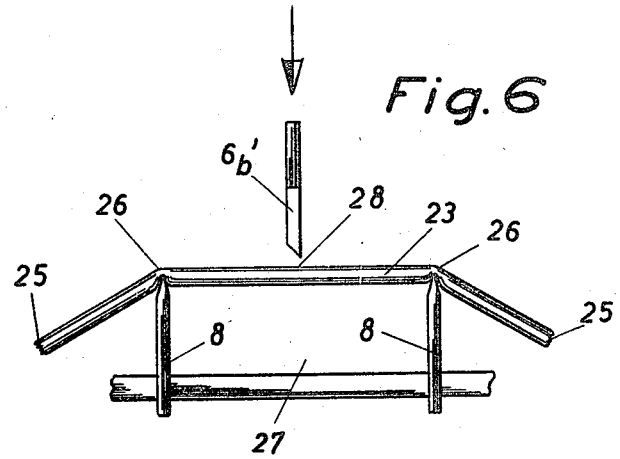

The invention will now be described with reference to the attached documents showing two different embodiments of the cutting apparatus according to the invention.
In the drawings:

FIG. 1 shows a cross section through a cutting apparatus provided with a device according to the invention arranged at the rear end of the combine-harvester, FIG. 2 is an end elevation shown partly in a vertical cross section of a rotor according to the second embodiment, FIG. 3 is a partly cut side elevation of this rotor, FIG. 4 is an end elevation of one of the knives of the rotor having clamping plate arranged behind this knife, FIG. 5 is a diagrammatical side elevation of the rotor according to FIG. 3 with straws situated on the grate arms of the apparatus, and FIG. 6 shows on an enlarged scale a part of a straw during the disintegration.

In FIG. 1 reference letter 1 denotes the rear end of a thresher, e.g. the thresher of a combine-harvester. Reference letter 2 denotes the cutter according to the invention intended for cutting the straw coming from the hopper sieve 3 of the thresher in such a way that this straw is disintegrated in rather short pieces. The cutter 2 comprises on one hand a rotor 4 comprising a rotation shaft 5 which carries disks. Arms 6 are attached to said disks and these disks rotate with the shaft. On the other hand, the cutter comprises a grate 7 for the straw at the disintegrating of the same, said grate comprising arms 8 situated at a certain distance, e.g. about 50 mm., from each other and the arms 6 pass between the arms 8 at the rotation of the rotor. The shaft 5 is carried by bearings 10 at the short sides of a box-shaped housing 9 being open at top and bottom, said bearings 10 being arranged on a carrying stand 11 at the rear end of the combine-harvester. The shaft 5 is driven preferably by means of a belt (not shown) from the thresher. The upper open end of the housing 9 is provided with a funnel-shaped portion 12 and the straw from the hopper sieve 3 falls down on this portion 12 and slides down on the grate 7. At its lower end the housing 9 is provided with a discharge opening provided with guide rails 13 for the disintegrated straw 14. The inclination of the grate arms 8 can be adjusted by means of a combined adusting and clamping device 15.

The rotor arms 6a, 6b as well as the grate arms 8 comprise thin cutting knives arranged in rows and extending in the longitudinal direction of the shaft 5. The number of rows of rotor knives is four in the shown embodiment. The pitch between the rotor knives 6a, 6b, in each row is twice the pitch between the grate knives 8. The arrangement is such that at the rotation of the rotor 4 the rotor knives 6a will pass through the space between each second pair of the grate knives 8 and thereupon the rotor knives 6b will pass through the space between adjacent pairs of grate knives. The effect thereby obtained will be explained more closely in connection with the following description of the function of the apparatus according to the embodiment shown in FIGS. 2 and 3.

In FIGS. 2–4 there is shown a drum 16 arranged on the rotor shaft 5, the mantle 17 of said drum 16 being provided with rectangular openings 18 situated diametrically opposite each other for the passage of the free ends of the knives 6a', 6b', said free ends being provided with cutting edges. Here, the rotor knives 6a', 6b' extend diametrically through the whole drum 16 and are passed through by the shaft 5. Against the rear border 19 of each rotor knife there abuts a clamping plate 20 which is tightened against the mantle 17 by means of each their bolt 21. The bolts extend through oblong apertures 22 in the plate 20 in question in such a way that the latter can be adjusted peripherally on the mantle. The rotor knives 6a' and 6b' extend perpendicularly to each other and they are displaced in relation to each other in axial direction with half the pitch between the knives in each row.

In FIG. 5 there is shown with dash and dot lines a straw 23 which from the sieve 3 has fallen down on the grate knives 8. When the rotor knives 6a' with a high speed pass down through the spaces 24 between the grate knives 8, the straw is cut at the places 25 (see also FIG. 6). Simultaneously the straw 23 is bent or crushed over the adjacent grate knives 8 as indicated in FIG. 6 at the places 26. When thereupon the rotor knives 6b' with a high speed pass down through the space 27 between the grate knives 8 in question the straw 23 is cut at the place 28 simultaneously as it is torn at the places 26. Due to this tearing the straw is crushed and looses its tube-shape. This is of great importance when the straw later on is ploughed down into the soil as the mouldering is hereby considerably facilitated.

Thus, the advantages obtained by means of the invention are not to be seen only in the reduced number of grate knives in relation to the number required in previous constructions for the good function of the apparatus but also therein that the cutting, crushing and tearing of the straw will be more favourable.

The invention has been described in the aforegoing for purposes of illustration only and is not intended to be restricted by this description or otherwise except as defined in the appended claims. Thus, the different details of the cutting device according to the invention may be modified in many ways without departure from the scope of the invention. For instance, the number of rows of rotor knives 6a, 6b is not of essential importance for the invention. However, the number of rows must in any case be an even number, i.e. two, four or six etc. As a rule more than four rows are however probably never required.

What I claim is:

1. In an apparatus for the disintegration of straw and similar material; a driven rotor, a housing for said rotor, said rotor provided with rows of arms, said rotor arm extending diametrically through a drum with their free ends projecting outside the mantle of said drum, said mantle having rectangular apertures situated diametrically opposite each other, said rotor arms extending through these apertures, a row of grate knives extending towards said rotor, said arms, at the operation of said rotor, adapted to pass between said grate knives, said arms and said knives provided with cutting edges, a device for feeding straw to be cut to said grate knives, a space between each rotor arm and the adjacent grate knife, said space permitting said arms by means of their elasticity to be displaced in lateral direction without touching the adjacent knife, the number of rows of rotor arms being an even number, the pitch between said rotor arms being two times the pitch between said grate knives, only every second row of rotor arms during the operation of the rotor adapted to pass through the space between the same pair of neighbouring grate knives, said drum on the outside of its mantle being provided with a clamping plate attached to said mantle by means of a bolt for being pressed against the rear—seen in the moving direction of the rotor—edge of the rotor arm in question.

2. In an apparatus for the disintegration of straw and similar material; a driven rotor, a housing for said rotor, said rotor provided with rows of arms, said rotor arms extending through a drum with the free ends projecting outside the mantle of said drum, a row of grate knives extending towards said rotor, said arms, at the operation of said rotor, adapted to pass between said grate knives, said arms and said knives provided with cutting edges, a device for feeding straw to be cut to said grate knives, a space between each rotor arm and the adjacent grate knife, said space permitting said arms by means of their elasticity to be displaced in lateral direction without touching the adjacent knife, the number of rows of rotor arms being an even number, the pitch between said rotor arms being two times the pitch between said grate knives, only every second row of rotor arms during the operation of the rotor adapted to pass through the space between the same pair of neighboring grate knives, said drum on the outside of its mantle being provided with a clamping plate attached to said mantle by means of a bolt for being pressed against the rear—seen in the moving direction of the rotor—edge of the rotor arm in question.

3. Apparatus as claimed in claim 2 wherein the number of said rows of said rotor arms is four.

References Cited

UNITED STATES PATENTS

| 2,152,791 | 4/1939 | Dahlstrom et al. | 146—123 X |
| 2,745,454 | 5/1956 | Fuelling | 146—117 |
| 2,754,126 | 7/1956 | Aune | 146—117 X |
| 2,986,186 | 5/1961 | White | 146—121 |
| 3,103,241 | 9/1963 | Weigel | 146—123 X |

W. GRAYDON ABERCROMBIE, *Primary Examiner.*